United States Patent [19]

Irlande

[11] Patent Number: 4,511,759
[45] Date of Patent: Apr. 16, 1985

[54] APPARATUS FOR CONTROLLING TRANSFERS OF FILES BETWEEN COMPUTERS

[76] Inventor: Jean-Paul Irlande, 4 Allée Bourvil, 94000 Rethel, France

[21] Appl. No.: 520,218

[22] Filed: Aug. 4, 1983

[30] Foreign Application Priority Data

Aug. 13, 1982 [FR] France ................ 82 14083

[51] Int. Cl.³ ..................................... H04L 13/10
[52] U.S. Cl. ................................................. 178/2 R
[58] Field of Search ............ 178/2 R, 2 A, 2 C, 2 D, 178/2 E, 71 R, 71 N, 74, 75, 3; 179/2 DP, 18 BD, 18 E, 3; 364/200, 900

[56] References Cited

PUBLICATIONS

A FIPS Conference Proceedings, 5-4-81, K. Hwang et al., "Engineering Computer Network": A Hardwired Network of UNIX Computer Systems, pp. 191-201.
IEEE Transactions on Communications, vol. COM-29, 4-81, No. 4, W. Tymes, Routing and Flow Control in Tymnet, pp. 329-398.
Patent Abstracts of Japan, vol. 5, No. 175, 11-11-81, p. 847.
IEEE International Conference on Communications, Conference Record, vol. 1, Jun. 13, 1982, "Terminal Interfaces for a Packet-Switched Network", p. 2.
Nachrichtentechnische Zeitschrift, vol. 32, No. 3, 3-79, H. Sarbinowski, "Die Nutzung Offentlicher Datenpaketvermittlungs-Dienste", pp. 177-182.

*Primary Examiner*—Stafford D. Schreyer
*Attorney, Agent, or Firm*—Handal & Morofsky

[57] ABSTRACT

Apparatus for controlling the transfer of data between computers, connected to a communications network, accessible to at least one terminal by means of an asynchronous concentrator, which is connected between the network and an input-output junction of the terminal, comprising means connected between the input-output junction of the terminal and the concentrator, in order to asynchronously establish via the concentrator, a first virtual circuit between the terminal and a first computer of the network, then a second virtual circuit between the terminaland a second computer of the network, and connecting means for connecting the thus established virtual circuits, the transfers of files between the first and second computers then taking place across these connecting means, wherein the means for establishing the first and second circuits comprise at least one two-position switch having a common terminal member connected to the input-output junction of the terminal and two switching terminal members connected to the concentrator and corresponding to the two positions of the switch, the latter making it possible to establish the first and second virtual circuits.

4 Claims, 7 Drawing Figures

APPARATUS FOR CONTROLLING TRANSFERS OF FILES BETWEEN COMPUTERS

BACKGROUND OF THE INVENTION

The present invention relates to an apparatus for controlling transfers of files between computers and more specifically for controlling transfers of files between two computers connected to a communication network accessible to at least one terminal, by means of an asynchronous concentrator, which is connected between the network and the input-output junction of the terminal.

The invention is applicable to transfers of files and more particularly to the transfers of data between computers connected to the same network, under the control of a terminal having access to the network. It can be used in networks for the transmission of data in packets, by the modulation of coded pulses, etc.

It is known that the access to a computer, in shared time, is at present a current operation. Thus, it is possible to read or write data constituting files contained in computer memories, from a terminal. Another need which has appeared more recently is to link several computers connected to the same communication network, particularly so as to be able to pass the content of files between computers. These networks are either specialized networks, or data transmission networks.

The problem of the transfer of files between computers of the same manufacturer is now already solved in a specific manner. However, this is not the case when it is necessary to link computers designed by different manufacturers and consequently which usually have different operational specifications. Numerous users wishing to link computers designed by different manufacturers, generally use a specific apparatus for transferring data between these computers. However, this apparatus is very expensive from the equipment and software standpoints. It cannot be used for transferring data between computers having operating specifications not corresponding to those of the computers for which this apparatus was constructed. Other designers propose architectures of networks making it possible to interconnect their own computers. As there is no complete and effective international standard, these architectures are worked out according to the standards of the individual manufacturer.

An international standard (ISO: International Standardization Organisation) is being prepared and will make it possible to define the structure of computer networks. Only when this has been achieved will it be possible to envisage data exchanges and the sharing of resources between several computers connected to the same network.

The existing apparatuses making it possible to transfer files between computers connected to the same network consequently have a number of disadvantages, because they are specific to certain types of computers and therefore expensive. Thus, it is generally necessary to insert between the computers which are to communicate across a network, conversion groups also for protocols, or intermediate management information supports, such as e.g. microcomputers. However, these considerable costs do not make it possible to provide apparatuses for controlling the transfers of files between computers of types differing from those of the initially provided computers.

SUMMARY OF THE INVENTION

The object of the present invention is to obviate these disadvantages and more particularly to provide an apparatus for controlling transfers of files between computers connected to a communication network accessible by at least one terminal, by means of an asynchronous concentrator, connected between the network and an input-output junction of the terminal. This apparatus makes it possible to link, by means of the network, computers of different types. Thus, without taking special measures, it makes it possible to replace a computer connected in a network and which is of a specific type, by a computer of a different type.

Therefore, the present invention relates to an apparatus for controlling the transfers of files between computers connected to a communications network accessible to at least one terminal via an asynchronous concentrator, which is connected between the network and an input-output junction of the terminal. It comprises means connected between the input-output junction of the terminal and the concentrator for asynchronously establishing, via the concentrator, a first virtual circuit between the terminal and a first computer of the network, then a second virtual circuit between the terminal and a second computer of the network, and connecting means for connecting the thus established virtual circuits. The transfers of files between the first and second computers then taking place across these connecting means.

According to another feature of the invention, the means for establishing the first and second virtual circuits, comprise at least one two-position switch having a common terminal member connected to an input-output junction of the terminal and two switching terminals connected to the switching terminal members and corresponding to the two positions of the switch, the latter making it possible to establish the first and second virtual circuits.

According to another feature of the invention, the connecting means comprise at least one two-terminal member interrupter, connected to the switching terminal members of the switch, the closing of said interrupter establishing the connection between the two computers.

According to another feature of the invention, the means for establishing the first and second virtual circuits, comprise a first two-position switch having a common terminal member connected to a cathode of a diode, whose anode is connected to an output of the input-output junction and two switching terminal members respectively connected to predetermined data reception inputs of the concentrator corresponding respectively to the virtual circuits to be established, a second two-position switch having a common terminal member connected to an input of the input-output junction and two switching terminal members respectively connected to two inputs of the concentrator corresponding to the virtual circuits to be established, said concentrator thus having an input and an output for each virtual circuit to be established.

According to another feature of the invention, the connecting means comprise a first interrupter and a first diode, connected in series between the input of the concentrator corresponding to the first virtual circuit and the output of the concentrator corresponding to the second virtual circuit, and a second interrupter and a second diode connected in series between the input of the concentrator corresponding to the second virtual circuit and the output of the concentrator corresponding to the first virtual circuit, said diodes being conductive in one direction passing from an output to an input of the concentrator.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
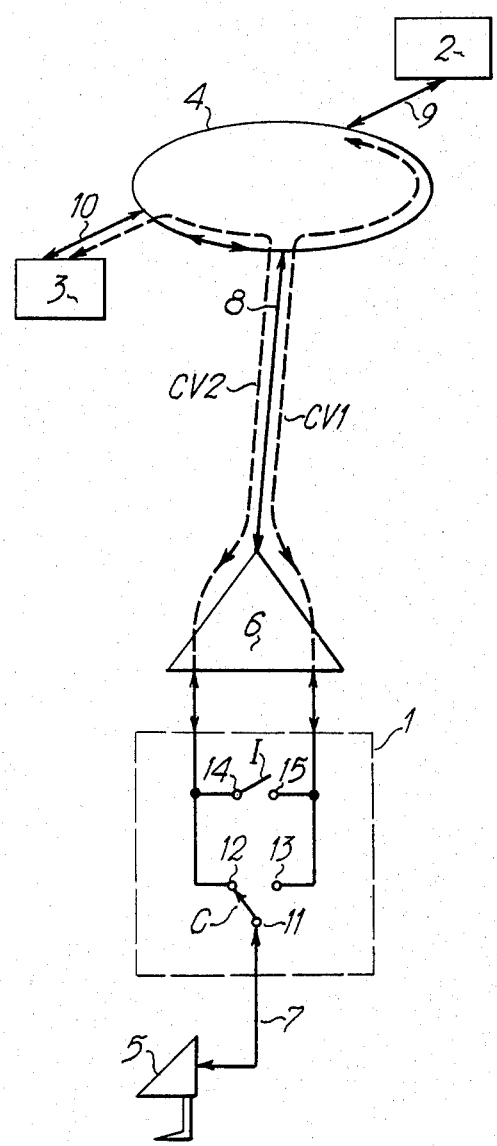
FIG. 1 very diagrammatically, an apparatus according to the invention for controlling the transfers of files between computers connected to a communications network accessible by a terminal.

FIG. 1 diagrammatically shows an apparatus 1 according to the invention, which makes it possible to control the transfers of files between computers 2, 3, connected to a communications network 4. This network is accessible to at least one terminal 5, via a concentrator 6 of asynchronous terminals connected between network 4 and an input-output junction 7 of terminal 5. A concentrator is well known in the art and constitutes a functional unit enabling data sources to use common transmission means. The number of data sources exceeds the number of available channels in said transmission means. For example, this concentrator can be a type in accordance with communications X3 and X28 of the CCITT (Comité Consultatif International Telégraphique et Téléphonique.). Junction 7, which makes it possible to connect terminal 5 to the inputs-outputs of concentrator 6, can e.g. be a junction of a type according to communication V24 of the CCITT. Network 4, as well as the respective connections 8, 9, 10, between said network, the concentrator 6 and the computers 2, 3 are connections of a type according to communication X25 of the CCITT.

Apparatus 1 comprises means C, which are connected between the input-output junction 7 of terminal 5 and concentrator 6. These means make it possible to asynchronously establish, via concentrator 6, e.g. a first virtual circuit EV1 between terminal 5 and a first computer 2 of the network. They also make it possible to establish e.g. a second virtual circuit CV2 between terminal 5 and a second computer 3 connected to the network. The apparatus also comprises connecting means I making it possible to connect virtual circuits CV1 and CV2, so as to ensure transfers of files between computer 2 and computer 3. In this particular drawing, the number of computers connected to the network has been limited to 2, but this number could be exceeded.

The notion of the virtual circuit is well known in the art and it is a certain service offered for a network which generally functions by transmission in packets. It corresponds to a procedure for establishing and releasing the communication, in which is fixed a predetermined period between two terminal data processing equipments, during which the data of users are transmitted in packets in the network. All the user data are transmitted by the network in the order in which said network receives them.

The means C which make it possible to establish the first and second virtual circuits CV1 and CV2, comprise at least one two-position switch having a common terminal member 11 connected to the input-output junction 7 of the terminal and two switching terminal members 12, 13 connected to concentrator 6. These terminal members correspond to the two positions of switch C and make it possible to establish the first and second virtual circuits CV1, CV2.

The connecting means I are constituted by at least one two-terminal interrupter 14, 15, connected to the terminal members 12, 13 of switch C. The closing of this interrupter makes it possible to establish the connection between the two computers 2, 3, after establishing the virtual circuits CV1, CV2.

The apparatus described hereinbefore functions as follows. By means of the asynchronous terminal 5 and as a result of switch C, through concentrator 6 is established a virtual circuit with each of the computers 2, 3. A shared time connection is then initialized on each of these computers. Then, by means of interrupter I, device 1 connects the two virtual circuits, thus permitting communication between the computers 2 and 3.

Figure 2:
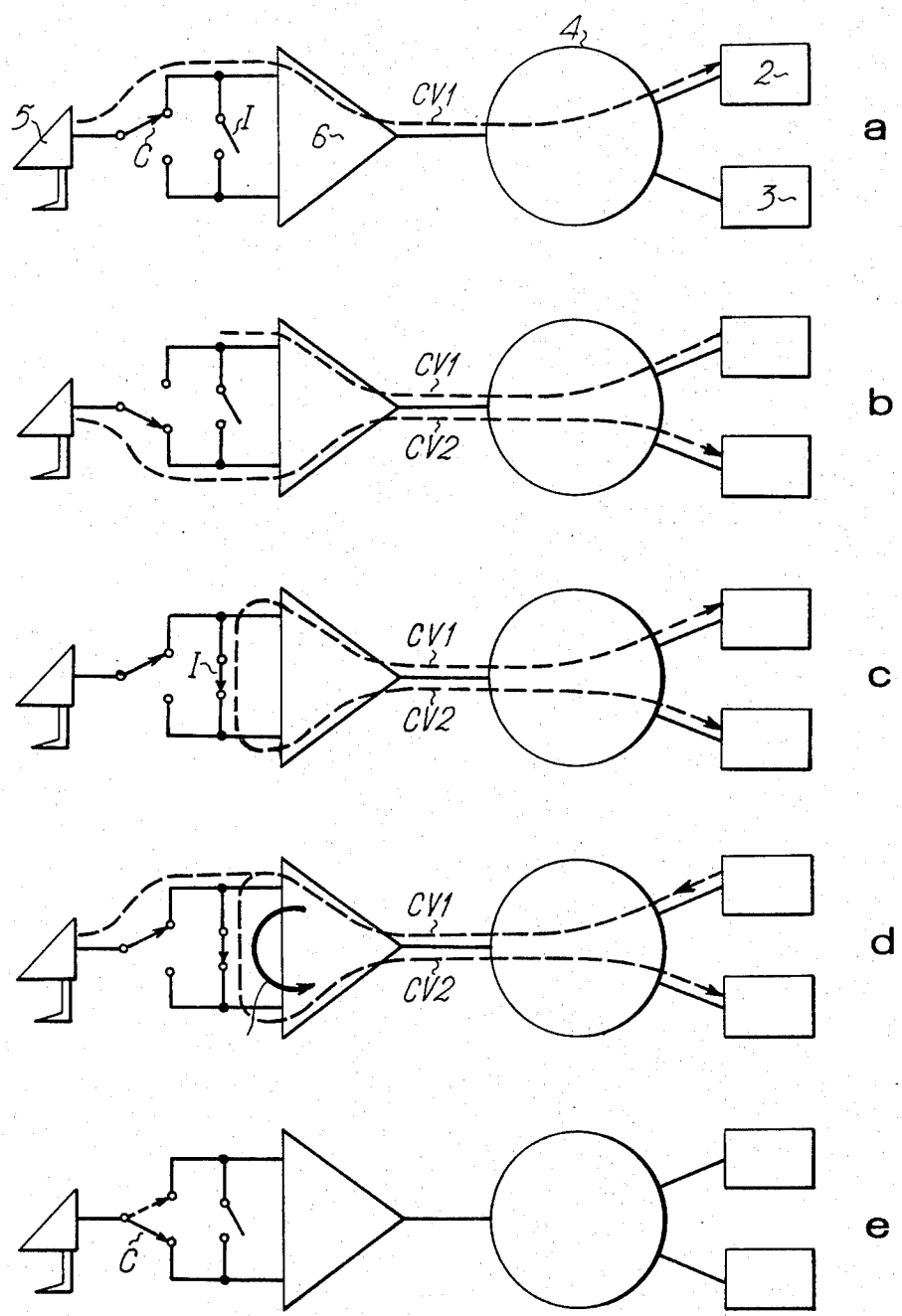
FIG. 2 diagrammatically in diagrams a, b, c, d and e, different stages of the operation of the apparatus according to the invention.

FIG. 2 shows diagrams permitting a better understanding of the different stages of the operation of the apparatus according to the invention. In these diagrams, as in FIG. 1, the terminal is 5, the means for establishing the virtual circuits are C and the means for connecting the virtual circuits are I. The concentrator is diagrammatically shown at 6 and the network at 4. The computers connected to the network are 2, 3. In this embodiment, it is considered that it is wished to transfer files between computer 2, operating with a GCOS operating system, and computer 3, operating with a MULTICS operating system, via a "packet transmission" network 4, known as TRANSPAC.

In diagram a, it is assumed that the communication is established between terminal 5 and computer 2, by means of these virtual circuits CV1. It is also assumed that computer 2 transmits and wishes to transfer a file to computer 3.

In diagram b, the communication is established between computer 3 and terminal 5, by means of the virtual circuit CV2, virtual circuit CV1 not being interrupted between the concentrator and the computer 2.

In diagram c, the position of switch C is reversed, whilst interrupter I is closed.

In diagram d, the terminal supplies an instruction to the transmitting computer 2, so that it transfers the data from a file contained in a not shown memory, to a receiving computer 3, across interrupter I and concentrator 6. Said data can optionally appear on a screen of terminal 5, to enable the operator to check the performance of the transfer.

In diagram e, it is assumed that the transfer of data from the file of computer 2 to computer 3 is ended. Interrupter I is open and then each computer is put back into communication with terminal 5 by means of switch C, in order to complete the shared time sessions between computers 2 and 3.

Figure 3:
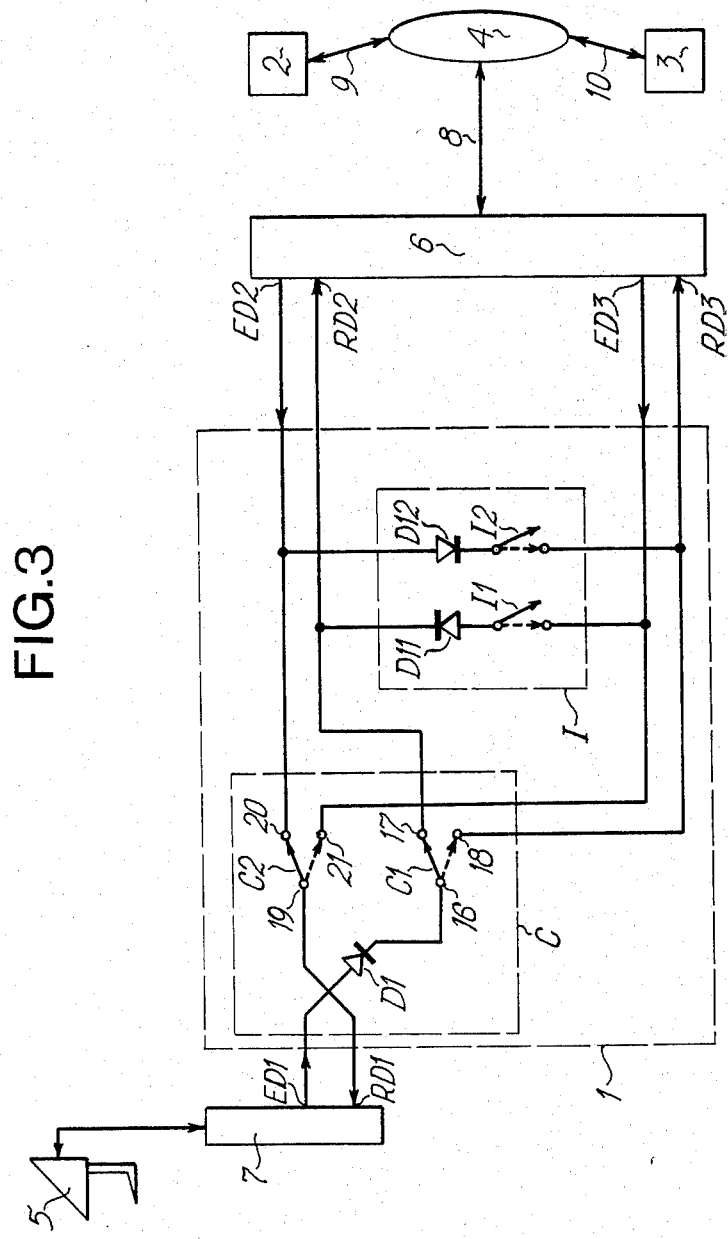
FIG. 3 in more detailed manner, the apparatus according to the invention.

FIG. 3 shows the apparatus according to the invention in a more detailed way. The means C making it possible to establish the first and second virtual circuits CV1, CV2 comprise a first two-position switch C1, which has a common terminal member 16 connected to a cathode of a diode D1. The anode of this diode is connected to an output ED1 of the input-output junction 7 of terminal 5. Two switching terminal members 17, 18 of the first switch C1 are respectively connected to two predetermined inputs RD2, RD3 of concentrator 6. These inputs respectively correspond to the virtual circuits CV1, CV2 to be established in order to transmit data respectively to computers 2, 3, connected to network 4. Said data are transmitted across virtual circuits CV1, CV2, which are shown in FIG. 1.

The means C making it possible to establish first and second virtual circuits also comprise a second two-position switch C2 having a common terminal member 19, connected to an input RD1 of the input-output junction 7 of terminal 5. This switch also has two switching terminal members 20, 21, respectively connected to two outputs ED2, ED3 of concentrator 6. With input RD1 of junction 7, these outputs correspond to the virtual circuits CV1, CV2 established between computers 2, 3 connected to network 4, in order to transmit data across these circuits to terminal 5. Thus, the concentrator has an input and an output for each virtual circuit to be established.

The connecting means I comprise a first interrupter I1 and a first diode D11, connected in series between input RD2 of concentrator 6, corresponding to the first virtual circuit, and output ED3 of the concentrator, corresponding to the second virtual circuit.

The connecting means I also comprise a second interrupter I2 and a second diode D12 connected in series between input RD3 of the concentrator corresponding to the second virtual circuit CV2 and the output ED2 of the concentrator corresponding to the first virtual circuit CV1. Diodes D14, D12 are conductive in a direction passing from output ED2 or ED3 of the concentrator to an input RD2, RD3 thereof.

In the apparatus described hereinbefore, the virtual circuits are established in data transmission to each of the computers, 2, 3, by means of switch C1. In data reception, these virtual circuits are established as a result of switch C2. When these operations have been performed, the transfer of data from a file contained in the memory of computer 2 takes place to computer 3, by closing interrupter I1, which was open at the time of establishing the virtual circuits. In the same way, the transfers of data from a file contained in a memory of computer 3 take place to computer 2, by closing interrupter I2, which was open at the time of establishing the virtual circuits. Diode D1 connected to output ED1 of junction 7 makes it possible to prevent any data reception on an output ED1 of said junction.

It is obvious that in the apparatus described hereinbefore, the means used could have been replaced by equivalent means, without passing beyond the scope of the invention.

What is claimed is:

1. An apparatus for controlling the transfer of data between computers, connected to a communications network, accessible to at least one terminal by means of an asynchronous concentrator, which is connected between the network and an input-output junction of the terminal, comprising means connected between the input-output junction of the terminal and the concentrator, in order to asynchronously establish via the concentrator, a first virtual circuit between the terminal and a first computer of the network, then a second virtual circuit between the terminal and a second computer of the network, and connecting means for connecting the thus established virtual circuits, the transfers of files between the first and second computers then taking place across these connecting means, wherein the means for establishing the first and second circuits comprise at least one two-position switch having a common terminal member connected to the input-output junction of the terminal and two switching terminal members connected to the concentrator and corresponding to the two positions of the switch, the latter making it possible to establish the first and second virtual circuits.

2. An apparatus according to claim 1, wherein the connecting means comprise at least one two-terminal interrupter, connected to the switching terminal members of the switch, the closing of said interrupter leading to the establishment of the connection between the two computers.

3. An apparatus according to claim 1, wherein the means for establishing the first and second virtual circuits, comprise a first two-position switch having a common terminal member connected to a cathode of a diode, whose anode is connected to an output of the input-output junction and two switching terminal members respectively connected to predetermined data reception inputs of the concentrator corresponding respectively to the virtual circuits to be established, a second two-position switch having a common terminal member connected to an input of the input-output junction and two switching terminal members respectively connected to two inputs of the concentrator corresponding to the virtual circuits to be established, said concentrator thus having an input and an output for each virtual circuit to be established.

4. An apparatus according to claim 3, wherein the connecting means comprise a first interrupter and a first diode, connected in series between the input of the concentrator corresponding to the first virtual circuit and the output of the concentrator corresponding to the second virtual circuit, and a second interrupter and a second diode connected in series between the input of the concentrator corresponding to the second virtual circuit and the output of the concentrator corresponding to the first virtual circuit, said diodes being conductive in one direction passing from an output to an input of the concentrator.

* * * * *